United States Patent
Lee

(10) Patent No.: US 9,250,492 B2
(45) Date of Patent: Feb. 2, 2016

(54) IN-CELL TOUCH PANEL STRUCTURE OF NARROW BORDER

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 49 days.

(21) Appl. No.: 14/323,902

(22) Filed: Jul. 3, 2014

(65) Prior Publication Data

US 2015/0009426 A1    Jan. 8, 2015

(30) Foreign Application Priority Data

Jul. 5, 2013  (TW) .............................. 102212728 U

(51) Int. Cl.
| | |
|---|---|
| G02F 1/1335 | (2006.01) |
| G02F 1/1362 | (2006.01) |
| G02F 1/1333 | (2006.01) |
| G06F 3/041 | (2006.01) |

(52) U.S. Cl.
CPC ...... *G02F 1/136286* (2013.01); *G02F 1/13338* (2013.01); *G06F 3/041* (2013.01); *G02F 1/133512* (2013.01)

(58) Field of Classification Search
CPC .................................................. G02F 1/13338
See application file for complete search history.

(56) References Cited

U.S. PATENT DOCUMENTS

2013/0265276 A1* 10/2013 Obeidat et al. ................ 345/174
2014/0070350 A1*  3/2014 Kim et al. ..................... 257/432

* cited by examiner

*Primary Examiner* — Timothy L Rude
(74) *Attorney, Agent, or Firm* — Muncy, Geissler, Olds & Lowe, P.C.

(57) ABSTRACT

An in-cell touch panel structure of narrow border includes an upper substrate, a lower substrate, a liquid crystal layer configured between the upper and lower substrates, a black matrix layer, a first sensing electrode layer, and a second sensing electrode layer. The first sensing electrode layer includes plural first conductor line units and plural connection lines arranged in a first direction. The second sensing electrode layer includes plural second conductor line units arranged in a second direction. When performing a touch sensing and receiving the touch driving signal, each second conductor line unit makes use of a corresponding connection line to be extended to one edge of the panel structure. The first conductor line units, the connection lines, and the second conductor line units are disposed corresponding to positions of the plurality of opaque lines of the black matrix layer.

10 Claims, 7 Drawing Sheets

IN-CELL TOUCH PANEL STRUCTURE OF NARROW BORDER

BACKGROUND OF THE INVENTION

1. Field of the Invention

The present invention relates to the technical field of touch panels and, more particularly, to an in-cell touch panel structure of narrow border.

2. Description of Related Art

Modern consumer electronic apparatuses are typically equipped with touch panels for use as their input devices. According to different sensing manners, the touch panels can be classified into resistive type, capacitive type, acoustic type, and optical type.

The principle of touch panels is based on different sensing manners to detect a voltage, current, acoustic wave, or infrared to thereby detect the coordinates of touch points on a screen where a finger or other medium touches. For example, a resistive touch panel uses a potential difference between the upper and lower electrodes to compute the position of a pressed point for recognizing the touch location, and a capacitive touch panel uses a capacitance change generated in an electrostatic combination of the arranged transparent electrodes with a human body to generate a current or voltage for detecting touch coordinates.

With the widespread use of smart phones, the multi-touch technique is getting more and more important. Currently, the multi-touch is implemented by projected capacitive touch technique.

The projected capacitive touch technique makes use of two layers of indium tin oxide (ITO) to form a matrix of sensing units arranged in intersected columns and rows, so as to detect precise touch positions. The projected capacitive touch technique is based on capacitive sensing, wherein it designs plural etched ITO electrodes and adds plural sets of transparent conductor lines that are on different planes and vertical with each other to form X-axis and Y-axis driving lines. These conductor lines are all controlled by a controller for being sequentially scanned to detect capacitance changes that are sent to the controller.

FIG. 1 is a schematic diagram of a prior touch panel structure 100. On the prior touch panel structure 100, the sensing conductor lines 110, 120 are arranged in the first direction (Y-direction) and in the second direction (X-direction). When a touch sensing is being performed and the sensing conductor lines 120 have to transmit the sensed signals to the control circuit 131 on a flexible circuit board 130, a great amount of wires at the side of the panel 140 is required for connection to the flexible circuit board 130. Such a prior design increases the border width of the touch panel and thus is not suitable for the trend of narrow border.

Therefore, it is desirable to provide an improved touch panel device to mitigate and/or obviate the aforementioned problems.

SUMMARY OF THE INVENTION

The object of the present invention is to provide an in-cell touch panel structure of narrow border, which can significantly increase the light penetrability of a touch panel and also can greatly save the material cost and the manufacturing cost, and which is suitable for narrow border design in comparison with the prior art.

To achieve the object, there is provided an in-cell touch panel structure of narrow border, which comprises: an upper substrate; a lower substrate parallel to the upper substrate; a liquid crystal layer configured between the upper substrate and the lower substrates; a black matrix layer arranged on one side of the upper substrate facing the liquid crystal layer, the black matrix layer being composed of a plurality of opaque lines; a first sensing electrode layer arranged on one side of the black matrix facing the liquid crystal layer and including M first conductor line units and N connection lines arranged in a first direction for detecting whether there is an external object approached according to a touch driving signal, where M and N are each a positive integer; and a second sensing electrode layer arranged on one side of the first sensing electrode layer facing the liquid crystal layer and including N second conductor line units arranged in a second direction, wherein, when performing a touch sensing and receiving the touch driving signal, each of the N second conductor line units makes use of a corresponding i-th connection line to be extended to one edge of the panel structure, where i is a positive integer and $1 \le i \le N$, wherein the M first conductor line units, the N connection lines, and the N second conductor line units are disposed corresponding to positions of the plurality of opaque lines of the black matrix layer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
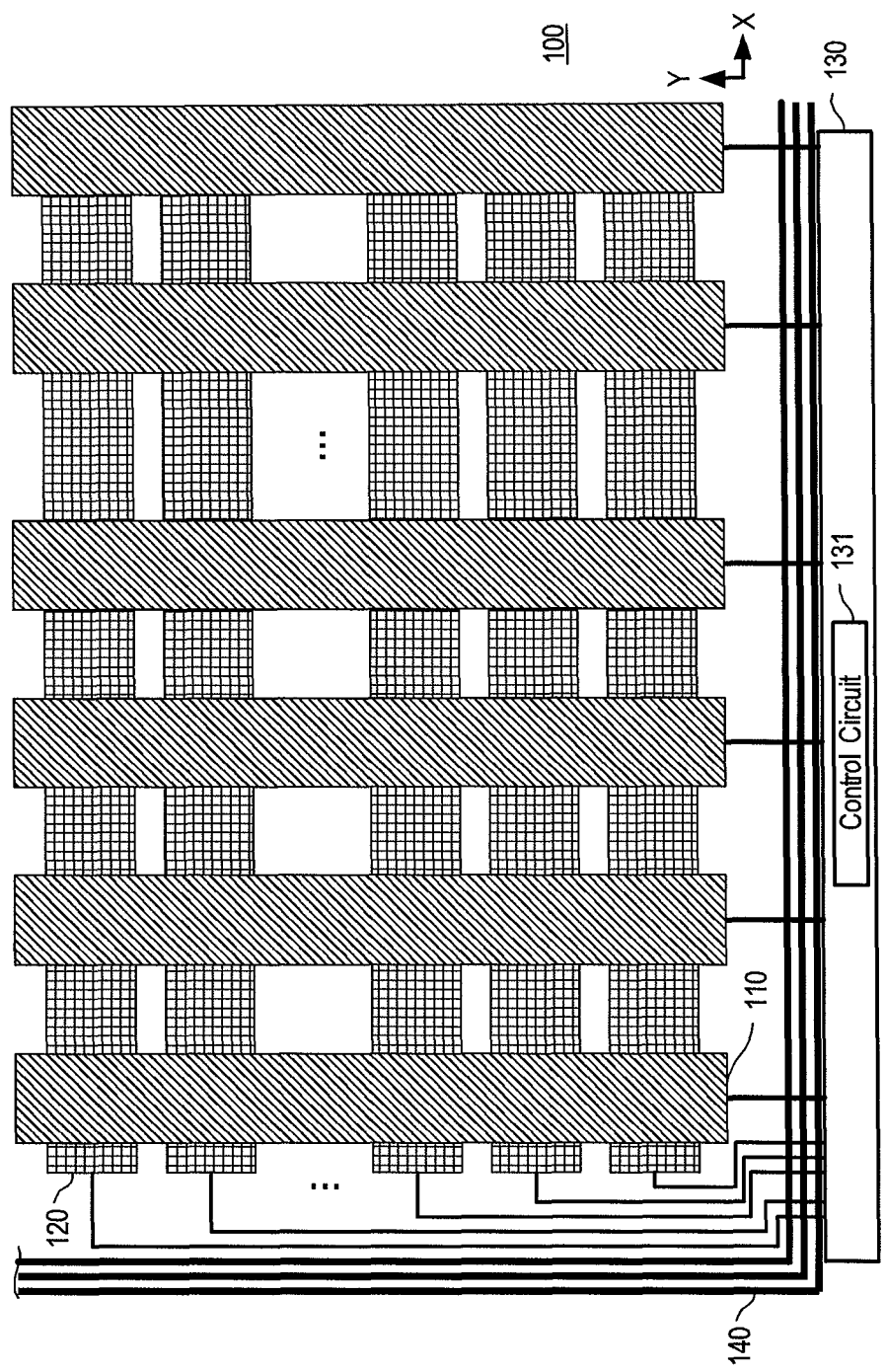
FIG. 1 is a schematic diagram of a prior touch panel structure.
Figure 2:
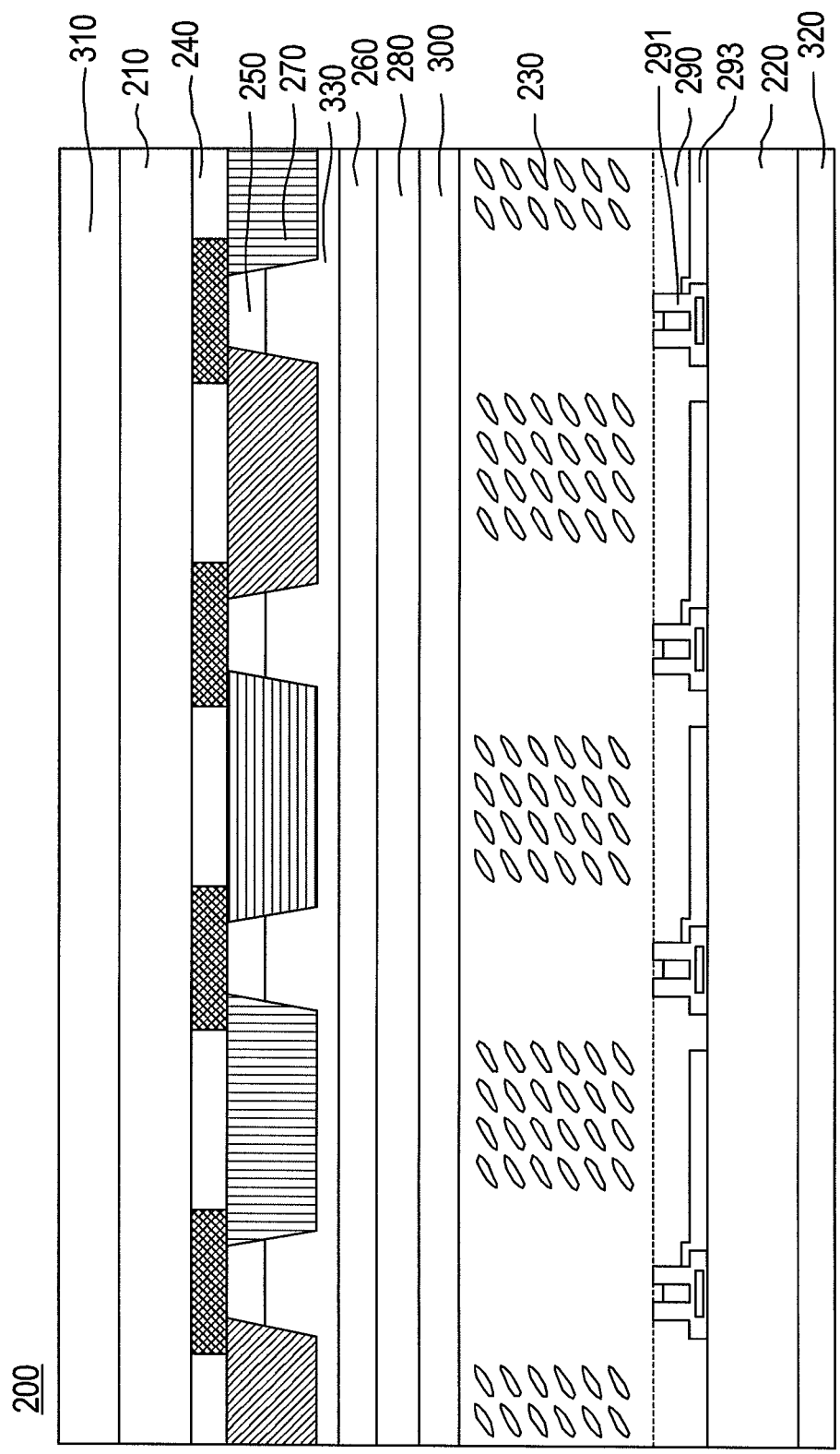
FIG. 2 is a stack diagram of an in-cell touch display panel structure of narrow border in accordance with the present invention.

With reference to FIG. 2, there is shown an in-cell touch display panel structure of narrow border 200 in accordance with the present invention. As shown, the in-cell touch display panel structure of narrow border 200 includes an upper substrate 210, a lower substrate 220, a liquid crystal layer 230, a black matrix layer 240, a first sensing electrode layer 250, a second sensing electrode layer 260, a color filter layer 270, an over coat layer 280, a thin film transistor (TFT) layer 290, a common electrode (Vcom) layer 300, a first polarizer layer 310, and a second polarizer layer 320.

The upper substrate 210 and the lower substrate 220 are preferably glass substrates and are parallel to each other. The liquid crystal layer 230 is disposed between the upper and lower substrates 210, 220.

The black matrix layer 240 is between substrate 210 and liquid crystal layer 230 and is disposed right next to the upper substrate 210. The black matrix layer 240 is composed of a plurality of opaque lines.

Figure 3:
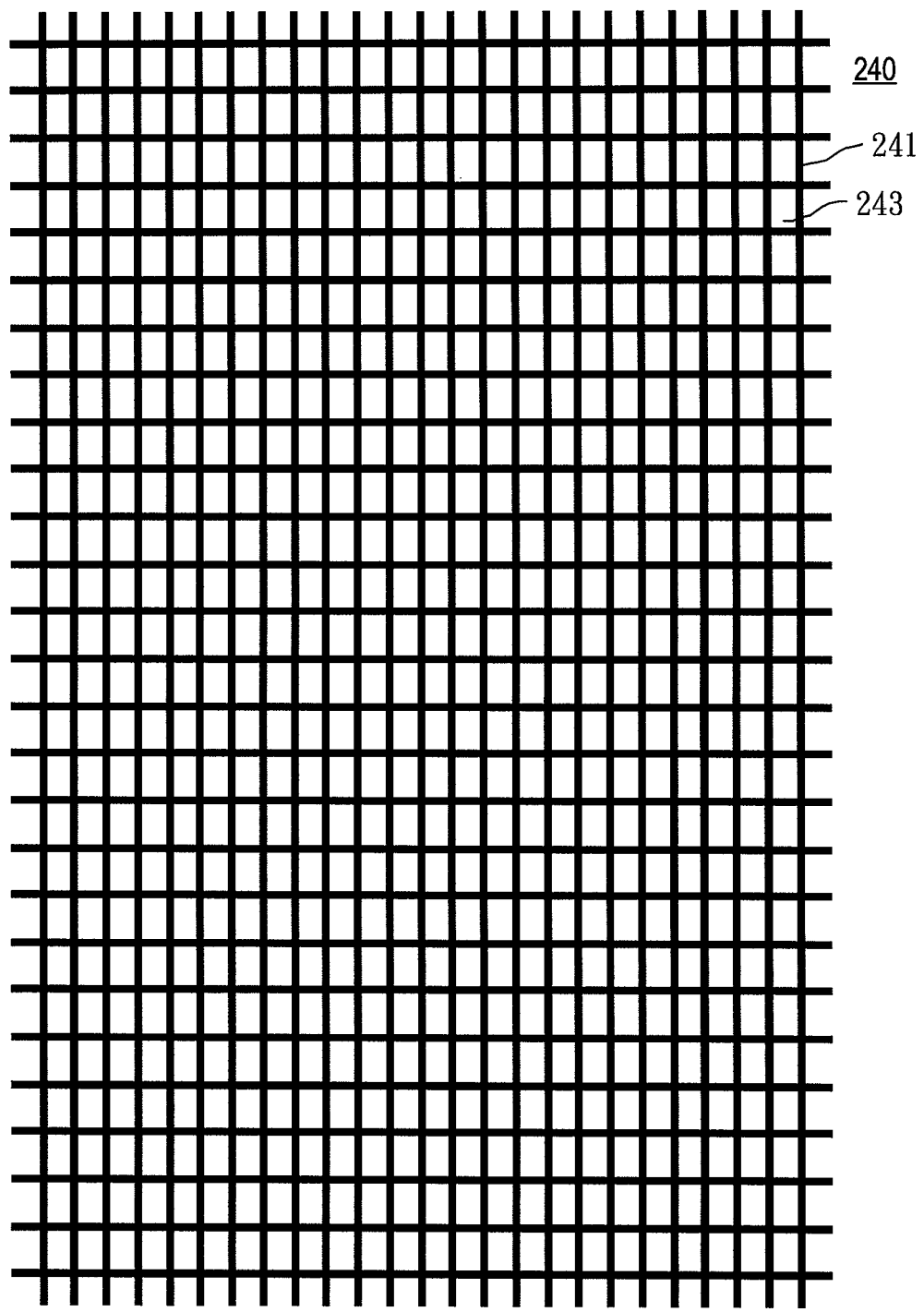
FIG. 3 schematically illustrates a black matrix layer.

FIG. 3 schematically illustrates the black matrix layer 240, which is the same as that of the known LCD device. As shown in FIG. 3, the black matrix layer 240 is composed of lines of insulating material that are black and opaque for forming the plurality of opaque lines 241. The lines of black insulating material are arranged as a checkerboard pattern, the color filter layer 270 is disposed in the areas 243 among the lines of black insulating material.

In the present invention, the first sensing electrode layer 250 and the second sensing electrode layer 260 are arranged on one side of the black matrix layer 240 that faces the liquid crystal layer 230, and a sensing touch pattern structure is thus formed by the first sensing electrode layer 250 and the second sensing electrode layer 260.

Figure 4:
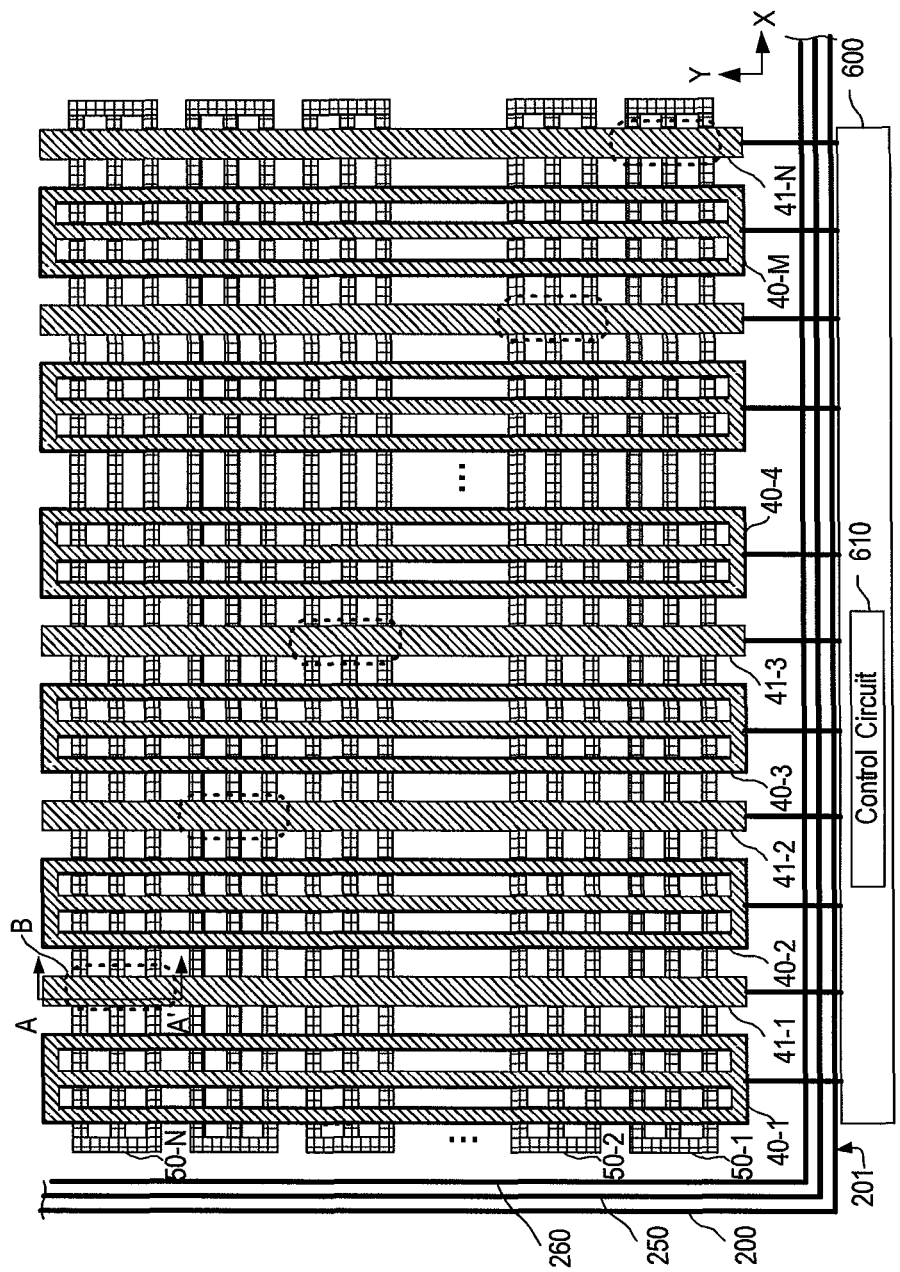
FIG. 4 is schematic diagram of an in-cell touch display panel structure of narrow border in accordance with a preferred embodiment of the present invention.

The first sensing electrode layer 250 is arranged on one side of the black matrix layer 240 facing the liquid crystal layer 230 and, with reference to FIG. 4, the first sensing electrode layer 250 includes M first conductor line units 40-1, 40-2, . . . , 40-M and N connection lines 41-1, 41-2, . . . , 41-N arranged in a first direction (Y-direction) for detecting whether there is an external object approached, where M and N are each a positive integer. The M first conductor line units 40-1, 40-2, . . . , 40-M and the N connection lines 41-1, 41-2, . . . , 41-N are made of conductive metal material.

The second sensing electrode layer 260 is disposed on one side of the first sensing electrode layer 250 facing the liquid crystal layer 230 and, with reference to FIG. 4, the second sensing electrode layer 260 includes N second conductor line units 50-1, 50-2, . . . , 50-N arranged in a second direction (X-direction). When performing touch sensing and receiving touch driving signals, each of the N second conductor line units 50-1, 50-2, . . . , 50-N makes use of a corresponding i-th connection line (41-1, 41-2, . . . , 41-N) to be extended to one edge 201 of the touch display panel structure 200, where i is a positive integer and 1≤i≤N. The first direction is substantially vertical with the second direction.

The M first conductor line units 40-1, 40-2, . . . , 40-M, the N connection lines 41-1, 41-2, . . . , 41-N, and the N second conductor line units 50-1, 50-2, . . . , 50-N are disposed at positions corresponding to those of the plurality of opaque lines 241 of the black matrix layer 240.

As shown in FIG. 4, which is a schematic diagram of an in-cell touch display panel structure of narrow border in accordance with a preferred embodiment of the present invention, each of the M first conductor line units 40-1, 40-2, . . . , 40-M is composed of plural metal sensing lines, for example three metal sensing lines in this embodiment, and each of the N second conductor line units 50-1, 50-2, . . . , 50-N is composed of plural metal sensing lines, for example three metal sensing lines in this embodiment. The M first conductor line units 40-1, 40-2, . . . , 40-M and the N second conductor line units 50-1, 50-2, . . . , 50-N are not electrically connected with each other. Preferably, an insulation layer may be arranged between the first sensing electrode layer 250 and the second sensing electrode layer 260. Alternatively, it is also applicable to arrange insulation traces or insulation blocks in-between the intersections of the M first conductor line units 40-1, 40-2, . . . , 40-M and the N second conductor line units 50-1, 50-2, . . . , 50-N.

The plural metal sensing lines of each of the M first conductor line units 40-1, 40-2, . . . , 40-M form a quadrilateral region, and the plural metal sensing lines of each of the N second conductor line units 50-1, 50-2, . . . , 50-N also form a quadrilateral region. The metal sensing lines in each quadrilateral region are electrically connected together, while any two of the quadrilateral regions are not connected with each other. The quadrilateral region has a shape of rectangle or square.

Each of the N connection lines 41-1, 41-2, . . . , 41-N is disposed between two first conductor line units (40-1, 40-2, . . . , 40-M).

The metal sensing lines in each quadrilateral region formed by the plural metal sensing lines of each of the M first conductor line units 40-1, 40-2, . . . , 40-M and the N second conductor line units 50-1, 50-2, . . . , 50-N are made of conductive metal material or alloy material. The conductive metal material is selectively to be chromium, barium, aluminum, silver, copper, titanium, nickel, tantalum, cobalt, tungsten, magnesium, calcium, potassium, lithium, indium, or a mixture of LiF, MgF2 or Li2O.

As shown in FIG. 4, each of the N second conductor line units 50-1, 50-2, . . . , 50-N is electrically connected with a corresponding connection line (41-1, 41-2, . . . , 41-N) at a position denoted by a dotted ellipse, and each of the N connection lines 41-1, 41-2, . . . , 41-N is extended to the same edge 201 of the touch display panel structure 200 through a corresponding metal wire for being further connected to the flexible circuit board 600. Each of the M first conductor line units 40-1, 40-2, . . . , 40-M is extended to the same edge 201 of the touch display panel structure 200 through a corresponding metal wire for being further connected to the flexible circuit board 600.

The surface of the touch display panel structure 200 is provided to receive at least one touch point. There is further provided with a control circuit 610 which is electrically connected to the M first conductor line units 40-1, 40-2, . . . , 40-M and the N second conductor line units 50-1, 50-2, . . . , 50-N via the flexible circuit board 600.

The M first conductor line units 40-1, 40-2, . . . , 40-M and the N second conductor line units 50-1, 50-2, . . . , 50-N correspondingly generate a sensing signal in response to the position and magnitude of a finger's touch on at least one touch point of the touch display panel structure 200. The control circuit 610 is electrically connected to the M first conductor line units 40-1, 40-2, . . . , 40-M and the N second conductor line units 50-1, 50-2, . . . , 50-N via the flexible circuit board 600, so as to calculate the coordinate of the at least one touch point based on the sensing signal.

Figure 5:
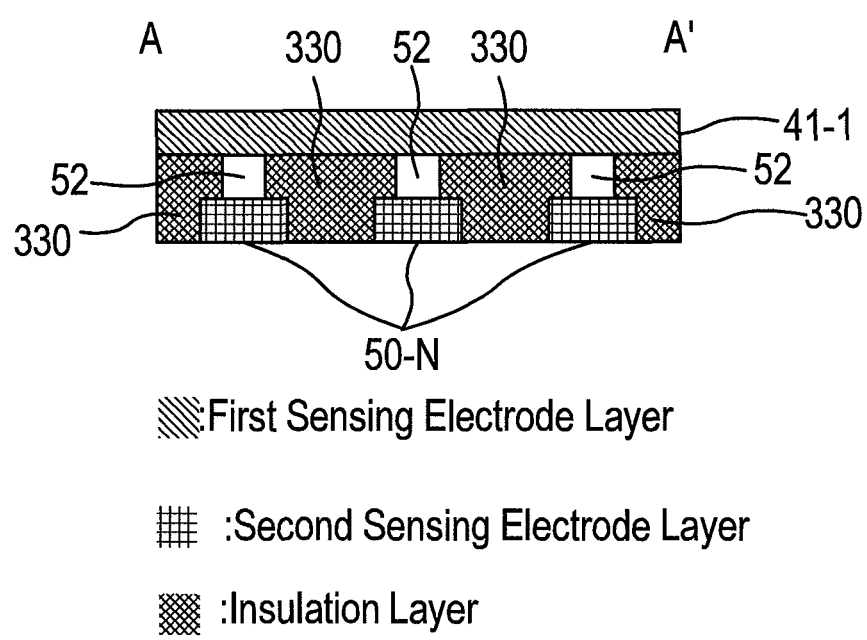
FIG. 5 is a cross sectional view taking along A-A' line of FIG. 4.

FIG. 5 is a cross sectional view taking along A-A' line of FIG. 4. As shown in FIG. 5, the second conductor line unit 50-N is connected with the connection line 41-1 at the position denoted by the dotted ellipse B of FIG. 4. With reference to FIGS. 2 and 5, the insulation layer 330 is arranged between the first sensing electrode layer 250 and the second sensing electrode layer 260, and the second conductor line unit 50-N is electrically connected to the connection line 41-1 through a via 52 that passes through the insulation layer 330. That is, with the connection line 41-1, the second conductor line unit 50-N is able to transmit the sensed signal to the control circuit 610.

Figure 6:
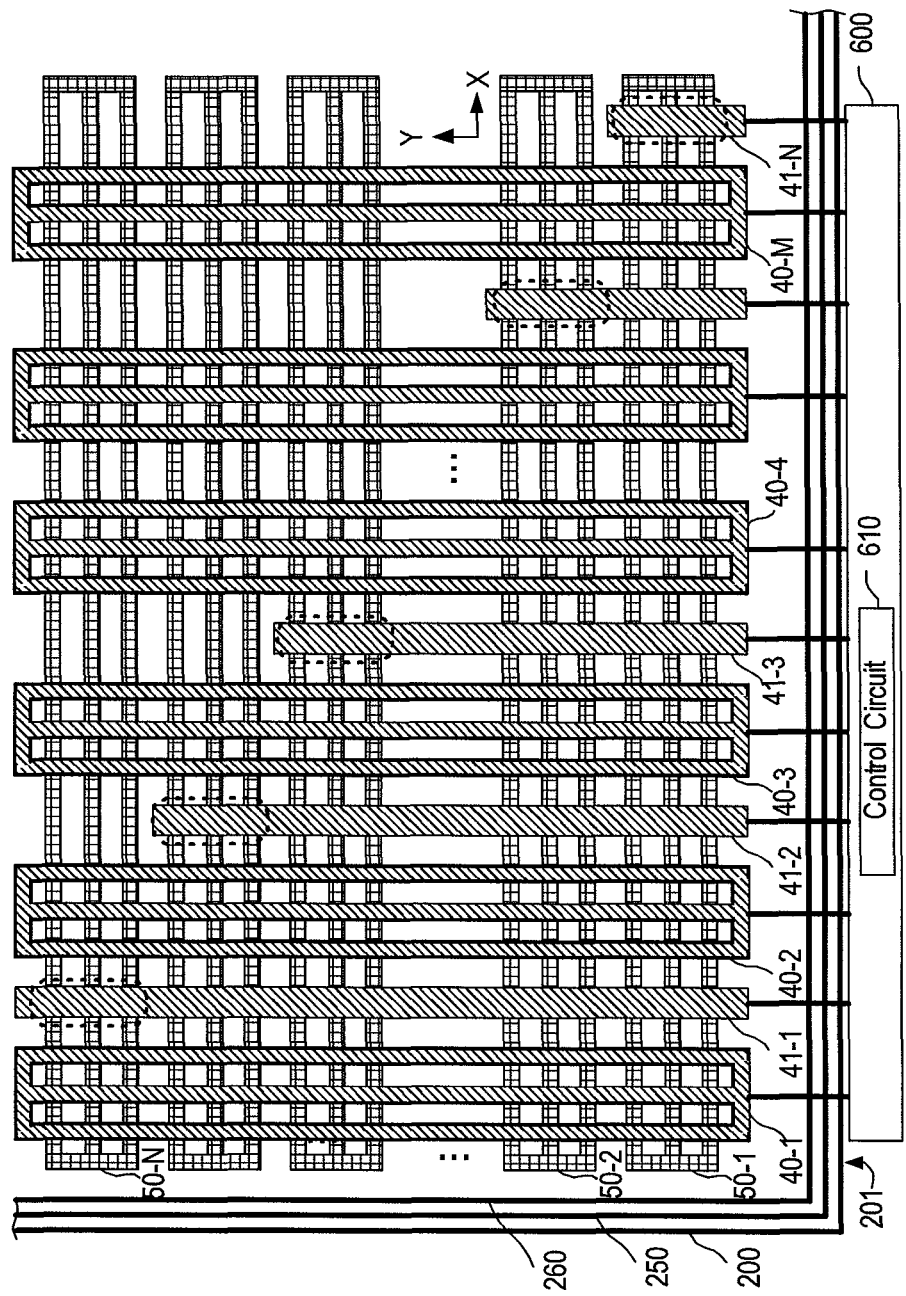
FIG. 6 is schematic diagram of an in-cell touch panel structure of narrow border according to another embodiment of the invention.

FIG. 6 is schematic diagram of an in-cell touch panel structure of narrow border 200 according to another embodiment of the invention, which is similar to FIG. 4 except that the N connection lines 41-1, 41-2, . . . , 41-N have different lengths. As shown, the lengths of the N connection lines 41-1, 41-2, . . . , 41-N are gradually decreased in this embodiment.

Figure 7:
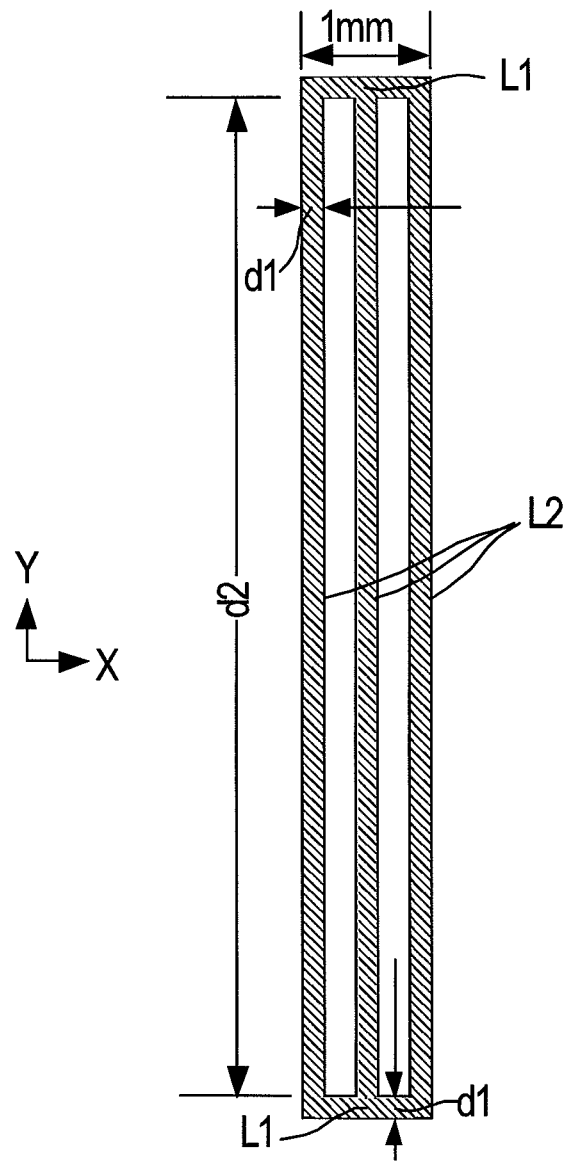
FIG. 7 is a schematic diagram of a first conductor line unit.

FIG. 7 is a schematic diagram of a first conductor line unit (40-1, 40-2, . . . , 40-M). As shown, the quadrilateral region is a rectangle composed of three metal sensing lines L2 in the first direction and two metal sensing lines L1 in a second direction. In other embodiments, the number of metal sensing lines can be varied according to the actual requirement.

The line width of the metal sensing line L1 or L2 is preferred to be smaller than or equal to the line width of each opaque line 241 of the black matrix layer 240. The M first conductor line units 40-1, 40-2, . . . , 40-M, the N connection lines 41-1, 41-2, . . . , 41-N, and the N second conductor line units 50-1, 50-2, . . . , 50-N are disposed at positions corresponding to those of the plurality of opaque lines 241 of the black matrix layer 240. Therefore, when viewing from the upper substrate 210 to the lower substrate 220, the M first conductor line units 40-1, 40-2, . . . , 40-M, the N connection lines 41-1, 41-2, . . . , 41-N, and the N second conductor line units 50-1, 50-2, . . . , 50-N are disposed at positions below those of the plurality of opaque lines 241, and thus can be concealed by the plurality of opaque lines 241, so that users only see the plurality of opaque lines 241 but not the M first conductor line units 40-1, 40-2, . . . , 40-M, the N connection lines 41-1, 41-2, . . . , 41-N, and the N second conductor line units 50-1, 50-2, . . . , 50-N. Accordingly the light penetration rate will not be influenced.

The thin film transistor layer 290 is arranged on one side of the lower substrate 220 facing the liquid crystal layer 230. The thin film transistor layer 290 includes K gate lines and L source lines for driving, based on a display pixel signal and a display driving signal, the corresponding pixel transistor and pixel capacitor, so as to perform a display operation, where K and L are each a positive integer. The thin film transistor layer 290 further includes thin film transistors 291 and transparent electrodes 293.

The color filter layer 270 is arranged on one side of the black matrix layer 240 that faces the liquid crystal layer 230. The common electrode layer 300 is disposed between the upper substrate 210 and the lower substrate 220. The over coat layer 280 is arranged on one side of the second sensing electrode layer facing the liquid crystal layer 230. The first polarizer layer 310 is arranged on one side the upper substrate 210 opposite to the other side of the upper substrate 210 facing the liquid crystal layer 230. The second polarizer layer 320 is arranged on one side of the lower substrate 220 opposite to the other side of the lower substrate 220 facing the liquid crystal layer 230.

In the prior art, the electrode pads made of ITO have an average light penetration rate of about 90%. In the present invention, the M first conductor line units 40-1, 40-2, . . . , 40-M, the N connection lines 41-1, 41-2, . . . , 41-N, and the N second conductor line units 50-1, 50-2, . . . , 50-N are disposed at positions below those of the plurality of opaque lines 241, so that the light penetration rate is not influenced. Therefore, the light penetration rate of the present invention is much better than that of the prior art. Accordingly, in comparison with the prior touch display panel, the in-cell touch display panel structure of narrow border 200 in accordance with the present invention shall have a higher brightness or the same brightness but consuming less backlight energy.

Furthermore, when ITO material is used as a bridge for connecting two ITO electrode points, it is likely to have broken points or defective electrical signals at the bridges due to that the expandability of ITO material is not as good as that of metal. On the other hand, if metal is used as a bridge for connecting two ITO electrode points, it is likely to have defective electrical signals at the bridges due to that metal and ITO are heterogeneous materials, resulting in negatively affecting the accuracy of touch detection.

However, in the present invention, the M first conductor line units 40-1, 40-2, . . . , 40-M, the N second conductor line units 50-1, 50-2, . . . , 50-N and the N connection lines 41-1, 41-2, . . . , 41-N are all made of metal, which has a better conductivity in comparison with the prior art, so as to easily transmit the sensed signals of the connection lines to the control circuit, thereby allowing the control circuit to accurately compute the touch coordinates. Accordingly, it is known that the present invention has a better light penetration rate in comparison with the prior art and can lower the manufacturing cost by avoiding the use of expensive ITO material, which is suitable for the touch display panel of narrow border.

Although the present invention has been explained in relation to its preferred embodiment, it is to be understood that many other possible modifications and variations can be made without departing from the spirit and scope of the invention as hereinafter claimed.

What is claimed is:

1. An in-cell touch panel structure of narrow border, comprising: an upper substrate; a lower substrate parallel to the upper substrate;
    a liquid crystal layer configured between the upper substrate and the lower substrates;
    a black matrix layer arranged on one side of the upper substrate facing the liquid crystal layer, the black matrix layer being composed of a plurality of opaque lines;
    a first sensing electrode layer arranged on one side of the black matrix facing the liquid crystal layer and including M first conductor line units and N connection lines arranged in a first direction for detecting whether there is an external object approached according to a touch driving signal, where M and N are each a positive integer;
    a second sensing electrode layer arranged on one side of the first sensing electrode layer facing the liquid crystal layer and including N second conductor line units arranged in a second direction, wherein, when performing a touch sensing and receiving the touch driving signal, each of the N second conductor line units makes use of a corresponding i-th connection line to be extended to one edge of the panel structure, where i is a positive integer and $1 \leq i \leq N$,
    wherein the M first conductor line units, the N connection lines, and the N second conductor line units are disposed corresponding to positions of the plurality of opaque lines of the black matrix layer; and
    wherein each of the M first conductor line units is extended to the same edge of the panel structure through a corresponding metal wire for being further connected to a flexible circuit board.

2. The in-cell touch panel structure of narrow border as claimed in claim 1, wherein the N connection lines are made of conductive metal material.

3. The in-cell touch panel structure of narrow border as claimed in claim 2, wherein each of the M first conductor line units is composed of plural metal sensing lines, and each of the N second conductor line units is composed of plural metal sensing lines.

4. The in-cell touch panel structure of narrow border as claimed in claim 3, wherein the plural metal sensing lines of each of the M first conductor line units form a quadrilateral region, and the plural metal sensing lines of each of the N second conductor line units form a quadrilateral region, such that the metal sensing lines in each quadrilateral region are electrically connected together, while any two of the quadrilateral regions are not connected with each other.

5. The in-cell touch panel structure of narrow border as claimed in claim 4, wherein the first direction is vertical with the second direction.

6. The in-cell touch panel structure of narrow border as claimed in claim 5, wherein each of the N connection lines is disposed between two first conductor line units.

7. The in-cell touch panel structure of narrow border as claimed in claim 6, wherein the quadrilateral region has a shape of rectangle or square.

8. The in-cell touch panel structure of narrow border as claimed in claim 7, wherein the metal sensing lines in each quadrilateral region formed by the plural metal sensing lines of each of the M first conductor line units and the N second conductor line units are made of conductive metal material or alloy material.

9. The in-cell touch panel structure of narrow border as claimed in claim 8, wherein the conductive metal material is selectively to be chromium, barium, aluminum, silver, copper, titanium, nickel, tantalum, cobalt, tungsten, magnesium, calcium, potassium, lithium, indium, or a mixture of LiF, $MgF_2$ or $Li_2O$.

10. The in-cell touch panel structure of narrow border as claimed in claim 9, further comprising:
- a thin film transistor layer arranged on one side of the lower substrate facing the liquid crystal layer, and including K gate lines and L source lines for driving corresponding pixel transistor and pixel capacitor based on a display pixel signal and a display driving signal, so as to perform a display operation, where K and L are each a positive integer;
- a color filter layer arranged on one side of the black matrix layer facing the liquid crystal layer;
- a common electrode layer disposed between the upper substrate and the lower substrate;
- a first polarizer layer arranged on one side the upper substrate opposite to the other side of the upper substrate facing the liquid crystal layer; and
- a second polarizer layer arranged on one side of the lower substrate opposite to the other side of the lower substrate facing the liquid crystal layer.

* * * * *